US006900867B2

United States Patent
Lee (12) United States Patent
(10) Patent No.: US 6,900,867 B2
(45) Date of Patent: May 31, 2005

(54) METHOD OF MANUFACTURING A COLOR FILTER SUBSTRATE FOR IN-PLANE SWITCHING MODE LIQUID CRYSTAL DISPLAY DEVICE

(75) Inventor: Jin Seok Lee, Kumi-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/735,519

(22) Filed: Dec. 14, 2000

(65) Prior Publication Data

US 2001/0013914 A1 Aug. 16, 2001

(30) Foreign Application Priority Data

Dec. 14, 1999 (KR) ........................................ 1999-57489

(51) Int. Cl.[7] ............................................. G02F 1/133
(52) U.S. Cl. ...................................... 349/122; 349/106
(58) Field of Search ........................ 428/1.53; 349/141, 349/138, 122, 106

(56) References Cited

U.S. PATENT DOCUMENTS

| | | | |
|---|---|---|---|
| 4,239,346 A | 12/1980 | Lloyd | 350/334 |
| 4,726,659 A | 2/1988 | Conrad et al. | 350/341 |
| 5,307,189 A | 4/1994 | Nishiki et al. | 359/59 |
| 5,321,535 A | 6/1994 | Ukai et al. | 359/55 |
| 5,459,596 A | 10/1995 | Ueda et al. | 359/59 |
| 5,464,669 A | 11/1995 | Kang et al. | 428/1 |

(Continued)

FOREIGN PATENT DOCUMENTS

| | | |
|---|---|---|
| EP | 0 368 260 | 5/1990 |
| EP | 0 588 568 | 9/1993 |
| EP | 0 749 029 | 12/1996 |
| JP | 60-158421 | 8/1985 |
| JP | 62-078532 | 4/1987 |
| JP | 04-067127 | 3/1992 |

(Continued)

OTHER PUBLICATIONS

S. Matsumoto, "Display Characteristics of In–Plane Switching (IPS) LCDs and a Wide–Viewing–Angle 14.5–in. IPS TFT–LCD,"; Euro Display '96, pp. 445–448.

H. Wakemoto, "An Advanced In–Plane–Switching Mode TFT–LCD," 1997 SID Digest, pp. 929–932.

(Continued)

Primary Examiner—Kenneth Parker (74) Attorney, Agent, or Firm—McKenna Long & Aldridge LLP (57) ABSTRACT

In a method of manufacturing a color filter for an in-plane switching mode liquid crystal display a black matrix for light-shielding and color filter layers of red, green and blue are formed on a glass substrate and an overcoat layer is coated thereon for minimizing a stepped difference of an overlapped part between the black matrix and the color filter layers, the overcoat layer being formed of a non-exposing type material.

27 Claims, 7 Drawing Sheets

U.S. PATENT DOCUMENTS

| | | | |
|---|---|---|---|
| 5,492,762 A | 2/1996 | Hirai et al. | 428/447 |
| 5,576,858 A | 11/1996 | Ukai et al. | 359/59 |
| 5,598,285 A | 1/1997 | Kondo et al. | 349/39 |
| 5,600,464 A | 2/1997 | Ohe et al. | 349/123 |
| 5,602,662 A | 2/1997 | Rosenblatt et al. | 349/130 |
| 5,608,556 A | 3/1997 | Koma | 349/143 |
| 5,646,705 A | 7/1997 | Higuchi et al. | 349/143 |
| 5,686,019 A | 11/1997 | Nakamura | 252/299.01 |
| 5,737,051 A | 4/1998 | Kondo et al. | 349/141 |
| 5,742,369 A | 4/1998 | Mihara et al. | 349/123 |
| 5,745,207 A | 4/1998 | Asada et al. | 349/141 |
| 5,757,455 A | 5/1998 | Sugiyama et al. | 349/129 |
| 5,760,856 A | 6/1998 | Yanagawa et al. | 349/42 |
| 5,760,857 A | 6/1998 | Yanagawa et al. | 349/43 |
| 5,786,876 A | 7/1998 | Ota et al. | 349/42 |
| 5,793,459 A | 8/1998 | Toko | 349/128 |
| 5,831,701 A | 11/1998 | Matsuyama et al. | 349/110 |
| 5,841,499 A | 11/1998 | Baur et al. | 349/141 |
| 5,852,485 A | 12/1998 | Shimada et al. | 349/141 |
| 5,859,682 A | 1/1999 | Kim et al. | 349/124 |
| 5,870,160 A | 2/1999 | Yanagawa et al. | 349/141 |
| 5,886,762 A | 3/1999 | Lee et al. | 349/141 |
| 5,907,380 A | 5/1999 | Lien | 349/141 |
| 5,910,271 A | 6/1999 | Ohe et al. | 252/299.01 |
| 5,914,762 A | 6/1999 | Lee et al. | 349/141 |
| 5,946,067 A | 8/1999 | Kim et al. | 349/141 |
| 5,956,111 A | 9/1999 | Ohta et al. | 349/141 |
| 5,959,708 A | 9/1999 | Lee et al. | 349/143 |
| 5,969,782 A | 10/1999 | Lee et al. | 349/141 |
| 5,977,562 A | 11/1999 | Hirakata et al. | 257/72 |
| 5,978,059 A * | 11/1999 | Ohta et al. | 349/141 |
| 5,995,186 A | 11/1999 | Hiroshi | 349/141 |
| 6,005,650 A | 12/1999 | Kim et al. | 349/130 |
| 6,040,887 A | 3/2000 | Matsuyama et al. | 349/141 |
| 6,208,399 B1 * | 3/2001 | Ohta et al. | 349/139 |
| 6,271,902 B1 * | 8/2001 | Ogura et al. | 349/106 |

FOREIGN PATENT DOCUMENTS

| | | |
|---|---|---|
| JP | 6-160878 | 6/1994 |
| JP | 06-273803 | 9/1994 |
| JP | 07-036058 | 2/1995 |
| JP | 07-134301 | 5/1995 |
| JP | 07-225388 | 8/1995 |
| JP | 08-062586 | 3/1996 |
| JP | 09-005763 | 1/1997 |
| JP | 09-005764 | 1/1997 |
| JP | 09-005793 | 1/1997 |
| JP | 09-033946 | 2/1997 |
| JP | 09-043589 | 2/1997 |
| JP | 09-043590 | 2/1997 |
| JP | 09-101538 | 4/1997 |
| JP | 09-105908 | 4/1997 |
| JP | 09-105918 | 4/1997 |
| JP | 09-258269 | 10/1997 |
| JP | 09-269507 | 10/1997 |
| JP | 09-325346 | 12/1997 |
| JP | 10-319436 | 12/1998 |
| KR | 96-32049 | 9/1996 |
| KR | 97-22458 | 5/1997 |
| KR | 98-040330 | 8/1998 |
| KR | 98-083765 | 12/1998 |
| KR | 100247819 | 12/1998 |
| WO | 97-10530 | 3/1997 |

OTHER PUBLICATIONS

M. Oh–e, "Principles and Characteristics of Electro–Optical Behaviour with In–Plane Switching Mode", Asia Display '95, pp. 577–580.

M. Ohta, "Development of Super–TFT–LCDs With In–Plane Switching Display Mode", 1995, Asia Display '95, pp. 707–710.

S. H. Lee et al., "High–Transmittance, Wide–Viewing–Angle Nematic Liquid Crystal Display Controlled by Fringe–Field Switching", Asia Display '98, pp. 371–374.

R. Kiefer et al., "In–Plane Switching of Nematic Liquid Crystals", Japan Display '92, pp. 547–550.

Correspondence from Korean Intellectual Property Office dated Dec. 18, 2004.

* cited by examiner

METHOD OF MANUFACTURING A COLOR FILTER SUBSTRATE FOR IN-PLANE SWITCHING MODE LIQUID CRYSTAL DISPLAY DEVICE

This application claims the benefit of Korean Patent Application No. 1999-57489, filed on Dec. 14, 1999, which is hereby incorporated by reference for all purposes as if fully set forth herein.

BACKGROUND OF THE INVENTION

1. Field of the Invention

The present invention relates to liquid crystal display device and, more particularly, to a method of manufacturing an in-plane switching mode liquid crystal display device.

2. Description of the Related Art

An in-plane switching mode liquid crystal display device, which is widely used as a flat panel display device having a wide viewing angle, uses a color filter consisting of red R, green G and blue B filters for a color display.

In order to manufacture such an in-plane switching mode liquid crystal display device, methods such as dye, pigment dispersion, electrodeposition, and print have been generally utilized, which will be described below.

First, the dye method refers to a method of dying a dyable and photosensitive resin on a transparent substrate with a dying solution after exposing and developing. The pigment dispersion method is typically divided into a method of exposing and developing a photosensitive color resin dispersed with a pigment on a photosensitive resin after coating, and a method of etching a non-photosensitive material dispersed with a pigment in a polyimide by using a photoresist. The electrodeposition method refers to a method of depositing a polymer resin on an electrode by dissolving and dispersing in a solvent. The print method refers to a method of transferring an ink dispersed with a pigment to a resin.

In the above described related art methods of manufacturing a color filter, the step of forming an overcoat layer is employed for preventing leakage of light by minimizing a stepped difference (or surface unevenness) of an overlapped part between a light-shielding black matrix and a color filter layer.

The in-plane switching mode liquid crystal display and a method of manufacturing a color filter in the related art will be described in more detail with reference to the accompanying drawings.

Figure 1:
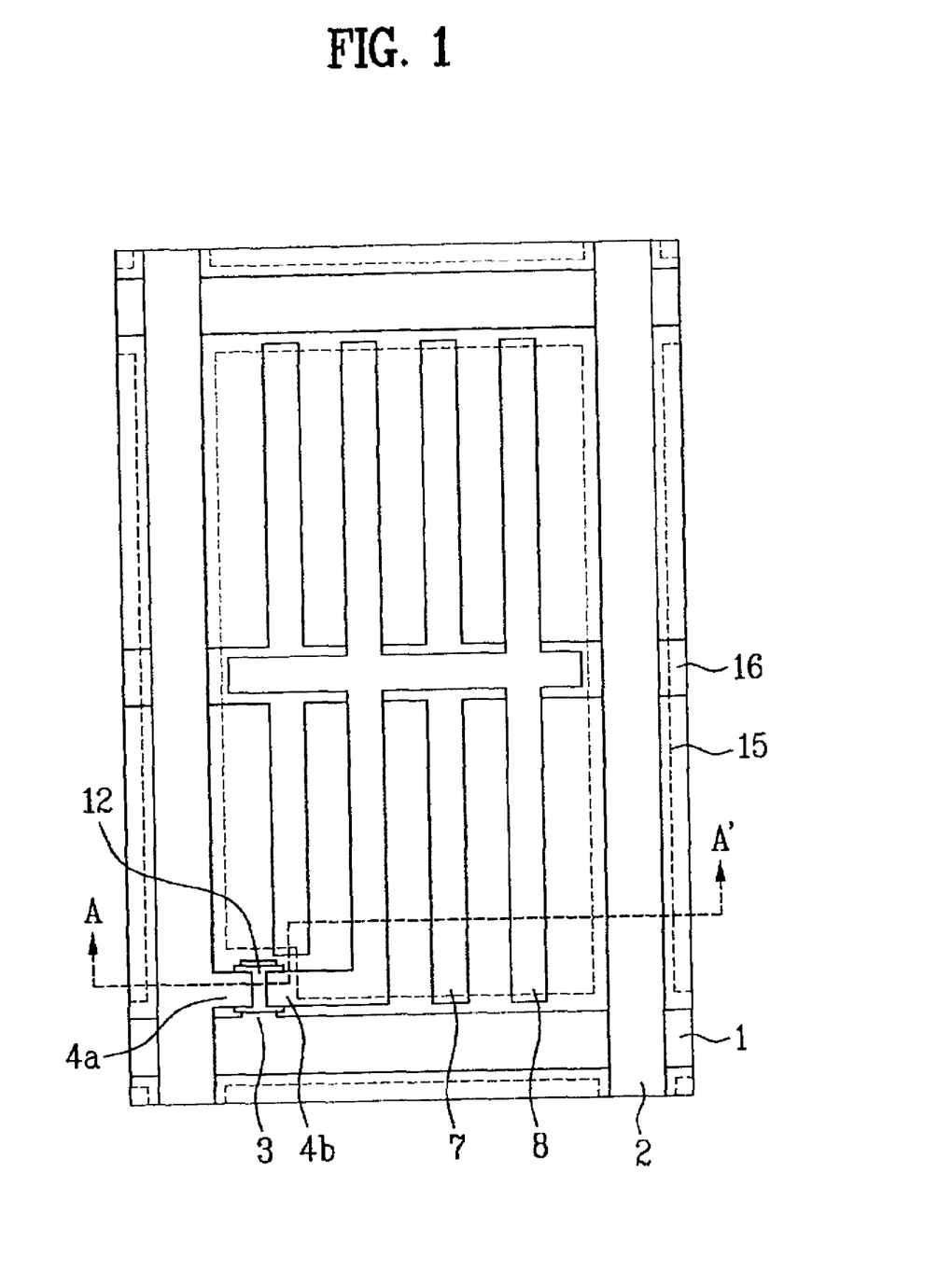
FIG. 1 is a plane view showing an in-plane switching mode liquid crystal display device in the related art.

FIG. 1 is a view showing a related art in-plane switching mode liquid crystal display device. In FIG. 1, the in-plane switching mode liquid crystal display device includes a gate line 1 and a data line 2 arranged longitudinally and transversely on a transparent first substrate 10 (refer to FIG. 2). Even though the gate line 1 and the data line 2 define a pixel area and a liquid crystal display panel is composed of a plurality of pixel areas, only a single pixel area is shown in FIG. 1 for the sake of convenience of explanation. In the pixel area, the gate line 1 and a parallel common line 16 are arranged and a thin film transistor is formed on a crossing point of the gate line 1 and the data line 2.

Figure 2:
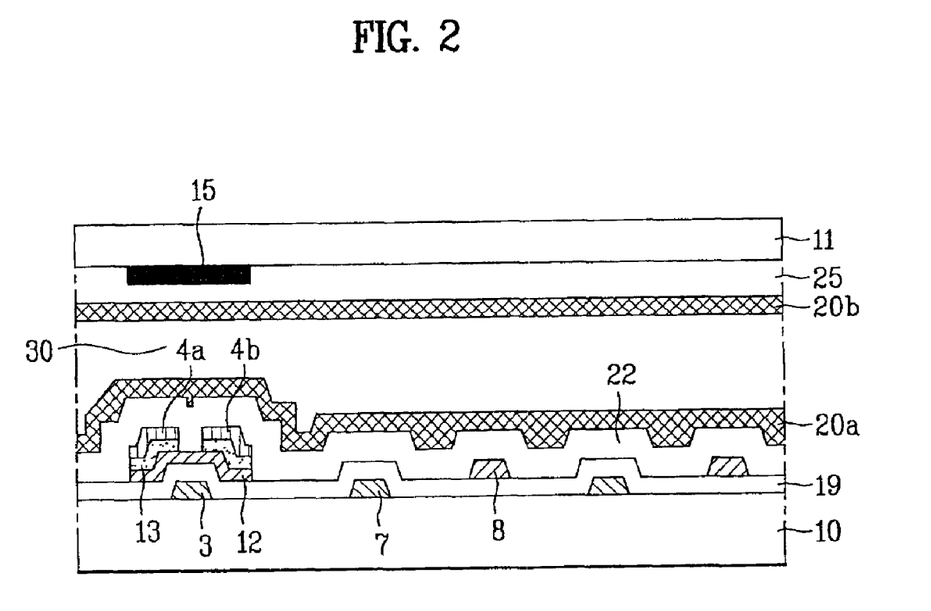
FIG. 2 is a cross-sectional view taken along line A–A' of FIG. 1.

FIG. 2 is a cross-sectional view taken along line A–A' of FIG. 1. In FIG. 2, the thin film transistor TFT includes a gate electrode 3, a gate insulation film 19, a source electrode 4a, a drain electrode 4b, a semiconductor layer 12, and an ohmic contact layer 13. The gate electrode 3 and the source electrode 4a are respectively connected to the gate line 1 and the data line 2 (refer to FIG. 1), and the gate insulation film 19 is deposited over the whole substrate.

The pixel area is formed with a common electrode 7 and a data electrode 8 which are arranged in parallel to each other for applying horizontal or in-plane electric fields. The common electrode 7 is formed on the first substrate 10 simultaneously with the gate electrode 3 and connected to the common line 16, and the data electrode 8 is formed on the gate insulation film 19 simultaneously with the source electrode 4a and the drain electrode 4b and connected to the drain electrode 4b of the TFT. Further, a protective layer 22 and a first alignment film 20a are formed on the whole first substrate 10.

A second substrate 11 is formed with a black matrix 15 and a color filter layer 25 for preventing leakage of light in the vicinity of the TFT, the gate line 1 and the data line 2 (refer to FIG. 1). A second alignment film 20b is formed thereon. Further, a liquid crystal layer 30 is formed between the first substrate 10 and the second substrate 11.

In the in-plane switching liquid crystal display device of the above described structure, liquid crystal elements in the liquid crystal layer 30 are aligned according to the alignment directions of the first alignment film 20a and the second alignment film 20b when no voltage is applied. On the other hand, if a voltage is applied between the common electrode 7 and the data electrode 8, an electric field that is parallel to the surface of the first substrate 10 is applied between the common electrode 7 and the data electrode 8, such that the liquid crystal elements in the liquid crystal layer 30 are switched by the transverse electric field. Accordingly, the liquid crystal elements in the liquid crystal layer 30 are aligned almost vertically to an extension direction of the common electrode 7 and the data electrode 8. As described above, since the liquid crystal elements in the liquid crystal layer 30 always switch on the same surface, grey level conversion does not occur when viewing from angles in the vertical and horizontal directions.

Figure 3A:
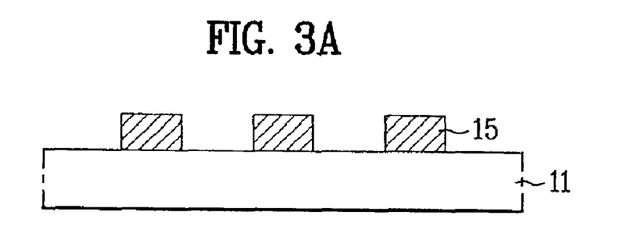
FIG. 3A to FIG. 3G show a related art process of coating an overcoat layer for removing a stepped difference between a black matrix for light shielding and a color filter.
Figure 3B:
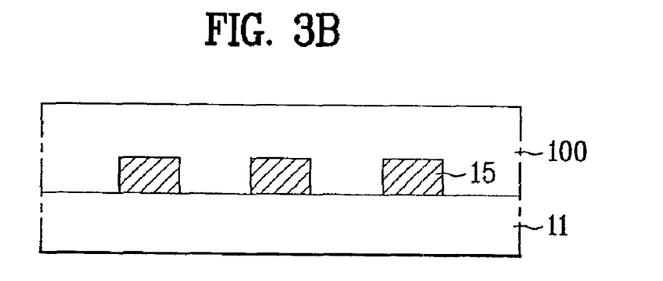
Figure 3C:
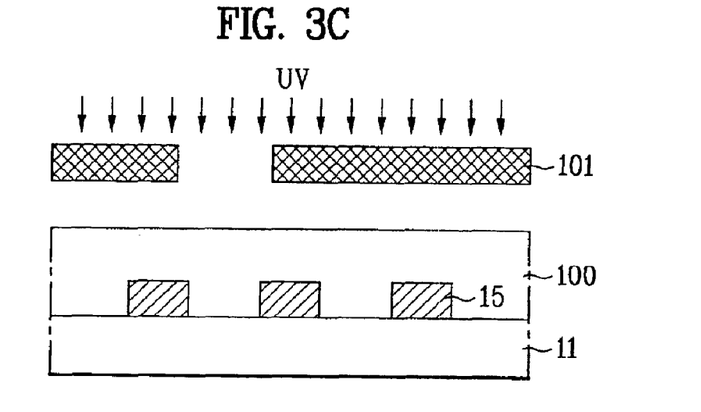
Figure 3D:
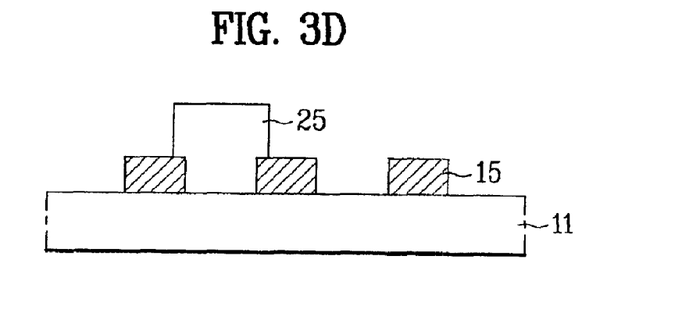
Figure 3E:
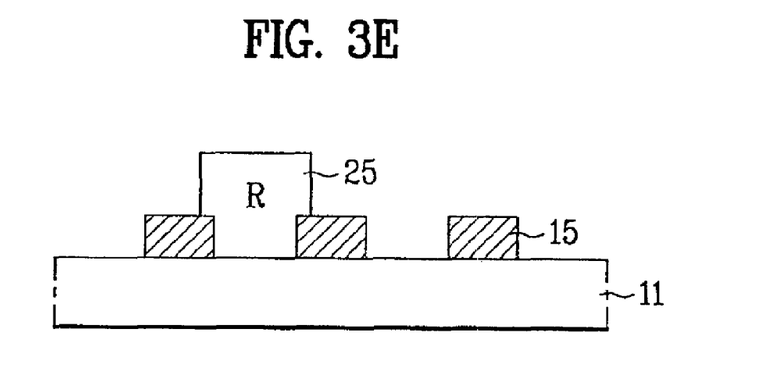
Figure 3F:
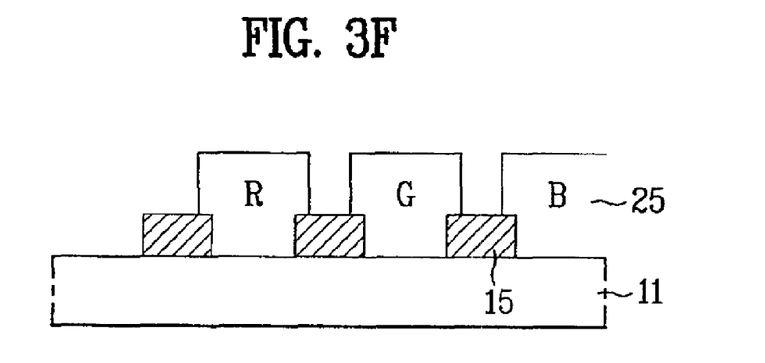
Figure 3G:
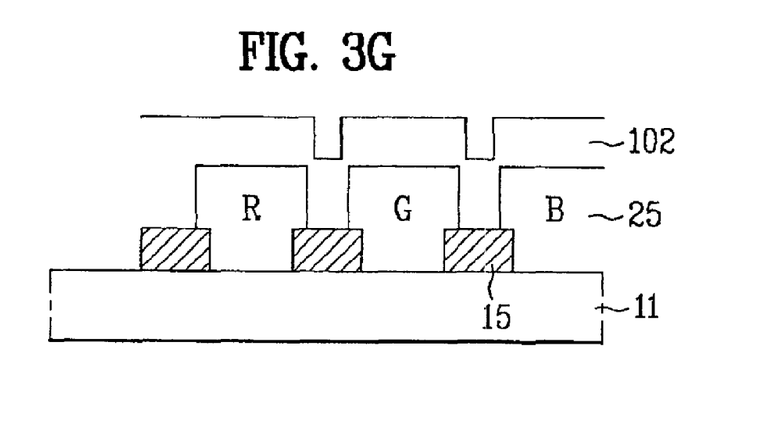

FIG. 3A to FIG. 3G are views for showing a related art process of coating an overcoat layer for removing a stepped difference between a black matrix for light-shielding and a color filter layer. First, as shown in FIG. 3A, the black matrix 15 is formed on the first substrate 11, a dyable photosensitive film 100 is coated thereon as shown in FIG. 3B and front exposed to UV light using a mask 101 as shown in FIG. 3C. A color filter layer 25 is thus formed as shown in FIG. 3D. Desired colors R, G and B are dyed and fixed as shown in FIG. 3E. By repeating the steps of FIG. 3B to FIG. 3E continuously, color filter layers of R, G and B 25 are formed on the glass substrate 11. However, it is very difficult to maintain a uniform thickness since such color filter layers R, G, and B 25 are formed separately. Accordingly, an overcoat layer 102 is coated thereon to planarize the color filter layer 25 and remove the stepped difference or unevenness of the overlapped part of the black matrix for light-shielding 15 and the color filter layer 25.

Figure 4A:
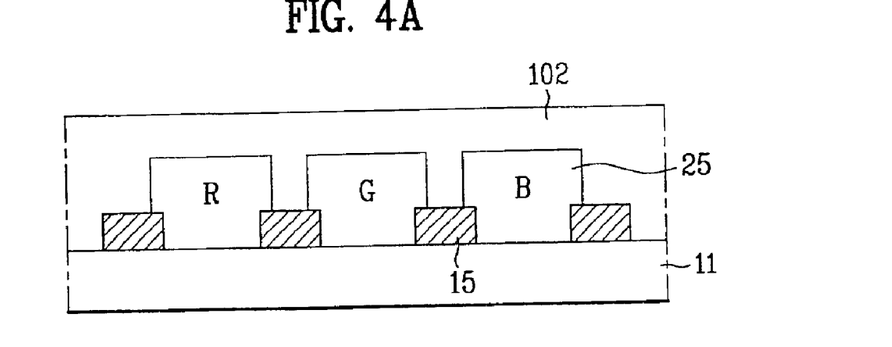
FIG. 4A to FIG. 4C are detailed views showing a related art process of coating an overcoat layer for removing a stepped difference of a black matrix for light shielding and a color filter.
Figure 4B:
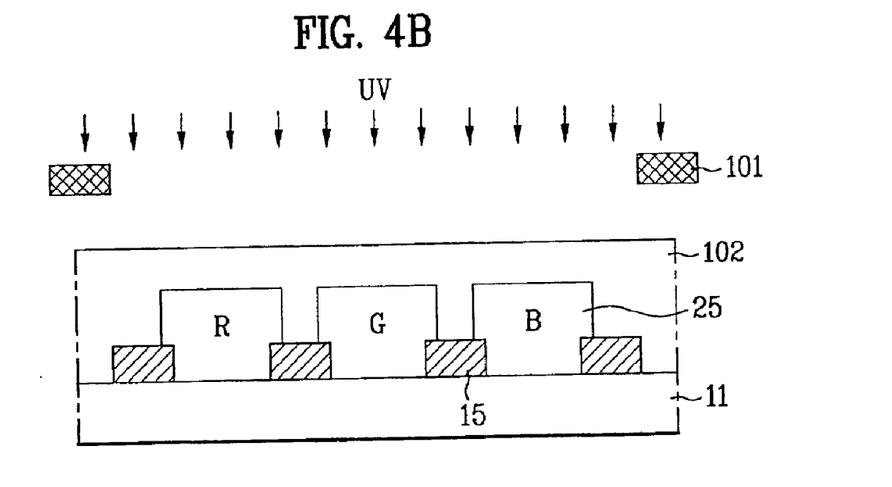
Figure 4C:
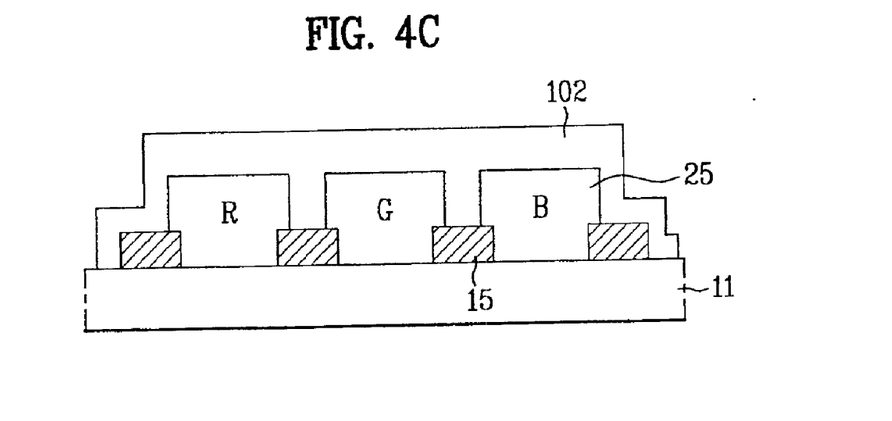

FIG. 4A to FIG. 4C are detailed views showing a related art process of coating an overcoat layer. The glass substrate, including the black matrix 15 and the color filter layer 25, is coated with the overcoat layer 102 with a polymer as shown in FIG. 4A. A mask 101 forms a pattern on the substrate which is coated with the overcoat layer 102 and exposed to ultraviolet light as shown in FIG. 4B. The overcoat layer 102 is removed by dispersing a developing solution on the substrate of which UV exposure is complete for forming a pattern. The overcoat layer 102 on the pattern is cured by post baking as shown in FIG. 4C. The overcoat layer 102 also functions to protect the color filter layer 25.

To planarize the color filter layer using the related art coating process of the overcoat layer, various processes are required including an exposing process, as described above. That is, to prevent the overcoat layer from being damaged during a rubbing process, an exposing process using an exposing type material and a developing process are used. However, such exposing and developing process is complicated and increases manufacturing cost, thereby decreasing productivity.

SUMMARY OF THE INVENTION

Accordingly, the present invention is directed to a color filter for a liquid crystal display that substantially obviate one or more of the problems due to limitations and disadvantages of the related art.

An advantage of the present invention is a color filter for a liquid crystal display in which a stepped difference of an overlapped part between a black matrix for light-shielding and a color filter layer is minimized by a simple process at a low cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of manufacturing a color filter for an in-plane switching mode liquid crystal display includes an overcoat layer using a non-exposing type material. Using such non-exposing type material eliminates the steps of mask blocking, exposing, developing, cleaning and drying when coating the overcoat layer for surface planarization.

The present invention forms the overcoat layer with a polymer and cures the overcoat layer by post baking.

Therefore, according to the present invention, the stepped difference in the overlapped part between the black matrix for light-shielding and the color filter layer is minimized by a simple step as compared to the related art, and a high resolution liquid crystal display can be made using a simple process at a low cost.

In the present invention, the productivity may be improved at a low cost by reducing the number of processes, mask defects, manufacturing cost of the mask, and consumption of developing and cleaning solutions by improving materials for an overcoat layer and using a non-exposing type process to eliminate mask blocking, exposing, developing, cleaning and drying steps for coating the overcoat layer for minimizing surface unevenness from overlapping portions between a black matrix for light-shielding and a color filter.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

FIG. 5A to FIG. 5F are views for explaining a method of coating an overcoat layer for removing a stepped difference between a black matrix for light-shielding and a color filter layer according to a preferred embodiment of the present invention.

Figure 5A:
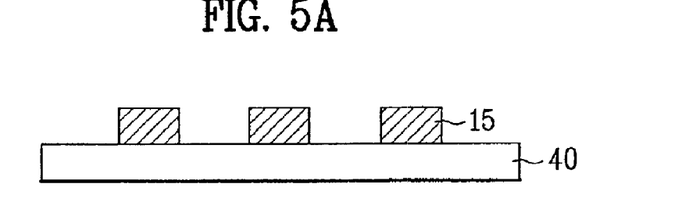
FIG. 5A to FIG. 5F are views showing a process of coating an overcoat layer for removing a stepped difference of a black matrix for light shielding and a color filter according to the present invention.
Figure 5B:
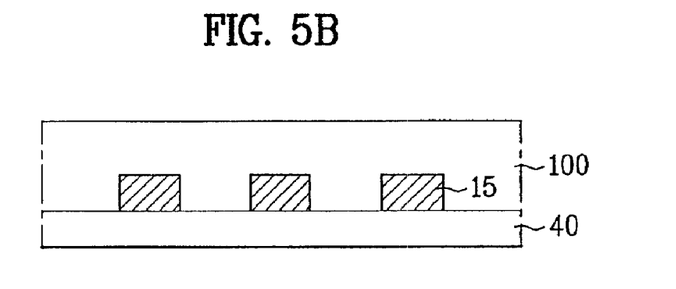

First, a black resin is coated and patterned on a substrate 40 (which may be an upper plate or a lower plate of a liquid crystal panel) for forming a black matrix 15 with predetermined intervals for light-shielding, as shown in FIG. 5A. A photosensitive film 100 is coated thereon as shown in FIG. 5B.

Figure 5C:
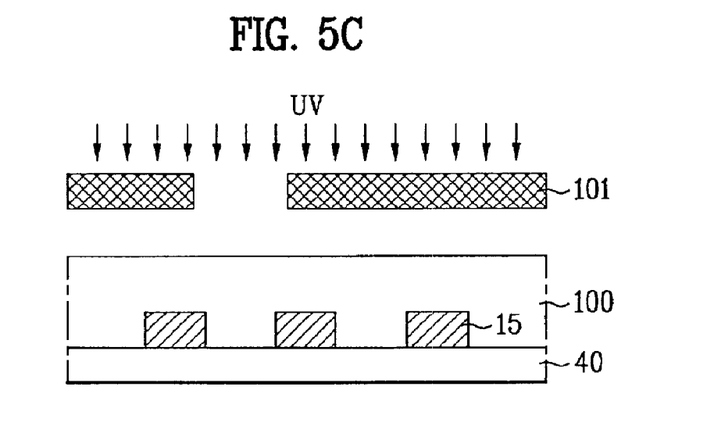
Figure 5D:
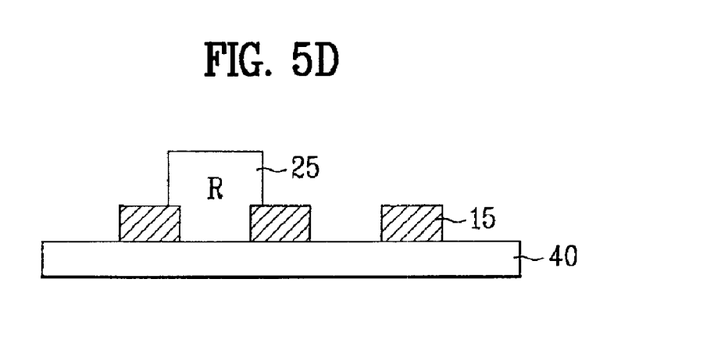
Figure 5E:
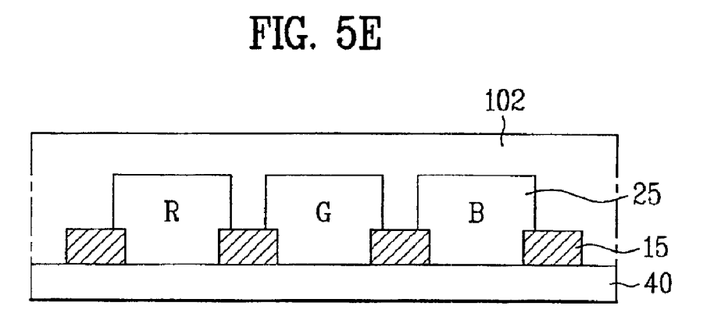
Figure 5F:
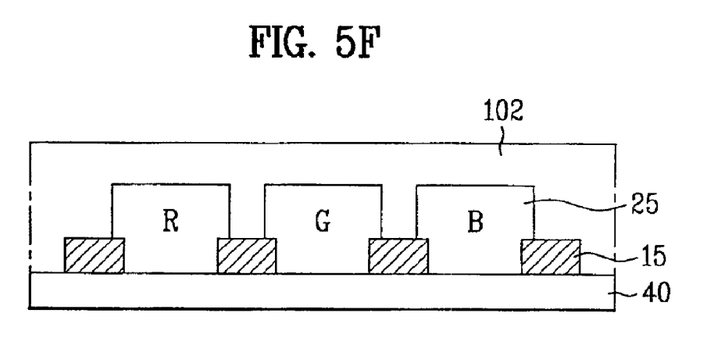

As shown in FIG. 5C, the substrate is exposed to ultraviolet light using a mask 101 to form a specific (R, G, or B) color filter layer. As shown in FIG. 5D, a pattern for the specific color filter layer 25 is formed and desired colors of red R, green G and blue B are dyed and fixed. Subsequently, the steps as shown in FIG. 5B and FIG. 5C are repeated to form the complete color filter layer 25 on the substrate 40. Next, as shown in FIG. 5E, an overcoat layer 102 is formed with a non-exposing type polymer material for surface planarization between the color filter layers 25. As shown in FIG. 5F, the substrate formed with the overcoat layer 102 is subject to curing.

A thermo-hardening material is preferably used as the overcoat layer 102. The thermo-hardening material includes a solvent, a binder, a hardener, a multi-functional monomer, and an additive. The solvent material includes PGMEA (propylene glycol monomethyl bis acetate) and EEP(ethoxy ethyl propionate). The binder material includes epoxy acrylate based material. The hardener material includes Amine based material. The multi-functional monomer material includes DPHA. The additive includes a surface transformer.

Also, a photo-hardening material can be used as the overcoat layer 102. The photo-hardening material includes a solvent, a binder, a photo inducer, a multi-functional monomer, and an additive. The solvent material includes PGMEA(propylene glycol monomethyl bis acetate) and EEP(ethoxy ethyl propionate). The binder material includes acrylate based material. The photo-inducer includes a benzophenone based material, an acetophenone based material, and a triazine based material. The multi-functional monomer material includes DPHA. The additive includes surface transformer and an adhesive stiffening agent.

Accordingly, it is possible to minimize the stepped difference between the color filter layers and the black matrix for light-shielding.

Figure 6:
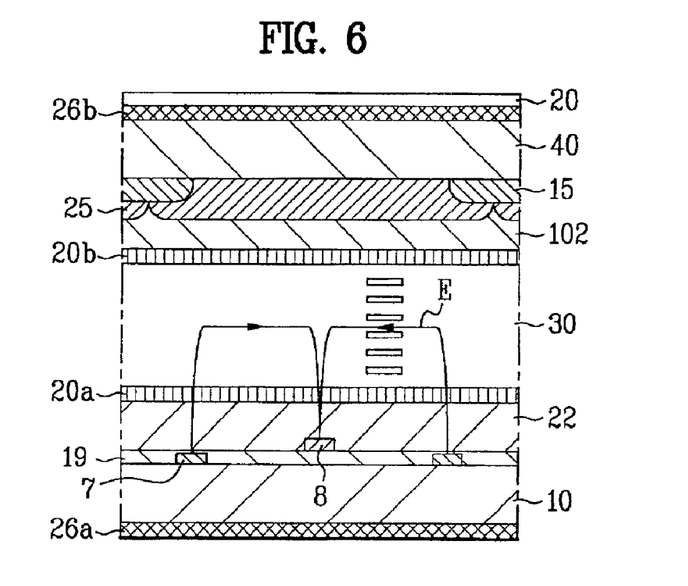
FIG. 6 is a sectional view of an in-plane switching mode liquid crystal display device according to an embodiment of the present invention.

FIG. 6 is a sectional view of an in-plane switching mode liquid crystal display device according to an embodiment of the present invention.

As shown in FIG. 6, the in-plane switching mode liquid crystal display device includes a data electrode 8 and a common electrode 7 formed on a first substrate 10, a plurality of light-shielding layers 15 formed on a second substrate 40, a color filter layer 25 formed over the second substrate 40, an overcoat layer 102 formed on the second substrate 40, the overcoat layer 102 including a non-exposing material, and a liquid crystal layer 30 formed between the first and second substrates 10 and 40. Polarized films 26a and 26b are respectively formed outside the first and second substrates 10 and 40. An alignment film for aligning the liquid crystal layer 30 is formed at an inner side of at least one of the first and second substrates 10 and 40. FIG. 6 shows the alignment films 20a and 20b formed inside the first and second substrates 10 and 40. The alignment films 20a and 20b are formed of polyamic acid and polyimide.

A method for fabricating the in-plane switching mode liquid crystal display device according to the embodiment of the present invention will be described with reference to FIG. 6.

First, the data electrode 8 and the common electrode 7 are formed on the first substrate 10, a plurality of the light-shielding layers 15 are formed on the second substrate 40. The color filter layer 25 is formed over the second substrate 40 including the light-shielding layer 15. The overcoat layer 102 is formed on the second substrate 40 and includes a non-exposing material. The liquid crystal layer 30 is formed between the first and second substrates 10 and 40.

The data electrode 8 and the common electrode 7 may be the same layer or different layers. The data and common electrodes 8 and 7 may be different layers if, for example, one is formed on the gate insulation layer 19 or the passivation layer 22. Also, the common electrode 7 is formed together with a gate electrode of a thin film transistor (not shown). The transparent conductive film 20 can be formed on the first substrate 10 or the second substrate 40. The transparent conductive film 20 can be formed on both the first and second substrates 10 and 40. The data electrode 8 is formed together with a source/drain electrode of the thin film transistor (not shown). Also, the common electrode 7 can be formed on the gate insulation layer 19 and the data electrode 8 can be formed on the passivation layer 22.

At least one of the data electrode 8 and the common electrode 7 is formed of a transparent conductive film or a metal. The metal includes Al, Mo, Cr, Ta, Ti, Al alloy, and their alloys.

A transparent conductive film can be formed outside the second substrate 40 to prevent static electricity from occurring on a surface of the substrate. It is also possible to perform the color filter forming process on the substrate 40 formed with the transparent conductive film 20 or to form the transparent conductive film 20 outside the substrate 40 after the color filter forming process. That is, the transparent conductive film 20 can be formed on the substrate 40 after the light-shielding layer 15 is formed. Also, the transparent conductive film 20 can be formed outside the first substrate 10.

According to the process of forming the overcoat layer of the present invention, the stepped difference between the color filter layers and the black matrix is minimized. Also, the overcoat layer is not damaged due to the rubbing process.

Further, the present method of manufacturing a color filter for an in-plane switching mode liquid crystal display uses a non-exposing type material as the overcoat layer. Using a non-exposing type material simplifies the overcoat layer forming process by eliminating such steps as mask mounting, exposing, developing, cleaning and drying.

Accordingly, the color filter for the in-plane switching mode liquid crystal display of the present invention is manufactured through a simple process, and has advantages of reducing mask cost, consumption of the developing and cleaning solutions, and mask defects. Also, the thickness of the black matrix and the color filter layers are uniformly maintained, thereby maintaining a liquid crystal display of a high resolution with improved productivity at a low cost.

It will be apparent to those skilled in the art that various modifications and variations can be made to the present invention without departing from the spirit and scope of the invention. The present invention covers the modifications and variations of this invention provided they come within the scope of the appended claims and their equivalents.

What is claimed is:

1. A method of manufacturing of an in-plane switching mode liquid crystal display device comprising:
   forming a data electrode and a common electrode on a first substrate;
   forming a light-shielding layer on a second substrate;
   forming a color filter layer over the second substrate;
   forming an overcoat layer over the second substrate, and curing the overcoat layer, the overcoat layer including a material using only a deposition and curing process, wherein the material includes an epoxy acrylate based material and at least one of an amine based material, a benzophenone based material, an acetophenone based material and a triazine based material; and
   forming a liquid crystal layer between the first and second substrates, wherein the light-shielding layer includes a black resin.

2. The method of claim 1, further comprising forming a transparent conductive film on a surface of the second substrate.

3. The method of claim 1, further comprising forming a transparent conductive film on a surface of the substrate before forming the light-shielding layer.

4. The method of claim 1, wherein the data electrode and the common electrode are in the same layers.

5. The method of claim 1, wherein the data electrode and the common electrode are in different layers.

6. The method of claim 1, wherein at least one of the data electrode and the common electrode includes a transparent conductive film.

7. The method of claim 1, wherein at least one of the data electrode and the common electrode includes a metal.

8. The method of claim 7, wherein the metal includes a material selected from the group consisting of Al, Mo, Cr, Ta, Ti, Al alloy and an alloy thereof.

9. The method of claim 1, further comprising forming a first alignment layer on the first substrate.

10. The method of claim 9, wherein the first alignment layer includes at least one of polyamic acid and polyimide.

11. The method of claim 1, further comprising forming a second alignment layer on the second substrate.

12. The method of claim 11, wherein the second alignment layer includes at least one of polyamic acid and polyimide.

13. The method of claim 1, wherein the overcoat layer includes a thermo-hardening material.

14. The method of claim 13, wherein the thermo-hardening material includes a binder.

15. The method of claim 13, wherein the thermo-hardening material includes a hardener.

16. The method of claim 1, wherein the overcoat layer includes a photo-hardening material.

17. The method of claim 16, wherein the photo-hardening material includes a binder.

18. The method of claim 15, wherein the photo-hardening material includes a photo-inducer.

19. A method of manufacturing a color filter substrate of a liquid crystal display device comprising:

forming a light-shielding layer on a substrate, the light-shielding layer including a black resin;

forming a color filter layer over the second substrate; and forming an overcoat layer over the second substrate including the light-shielding layer and the color filter layer, and curing the overcoat layer, the overcoat layer including a material using only a deposition and curing process, wherein the material includes an epoxy acrylate based material and at least one of an amine based material, a benzophenone based material, an acetophenone based material and a triazine based material.

20. The method of claim 19, further comprising forming a transparent conductive film on a surface of the second substrate.

21. The method of claim 19, further comprising forming a transparent conductive film on a surface of the substrate before forming the light-shielding layer.

22. The method of claim 19, further comprising forming an alignment layer on the substrate.

23. The method of claim 22, wherein the alignment layer includes at least one of polyamic acid and polyimide.

24. The method of claim 19, wherein the overcoat layer includes a thermo-hardening material.

25. The method of claim 24, wherein the thermo-hardening material includes a binder.

26. The method of claim 19, wherein the overcoat layer includes a photo-hardening material.

27. The method of claim 26, wherein the photo-hardening material includes a binder.

* * * * *